(12) United States Patent
Suwa et al.

(10) Patent No.: US 7,086,768 B2
(45) Date of Patent: Aug. 8, 2006

(54) ILLUMINATION DEVICE AND ILLUMINATED INPUT DEVICE

(75) Inventors: Katsuhiko Suwa, Hirakata (JP); Eizaburou Higuchi, Shinagawa-ku (JP)

(73) Assignees: Matsushita Electric Industrial Co., Ltd., Osaka (JP); Nitto Jushi Kogyo Co., Ltd., Tokyo (JP)

( * ) Notice: Subject to any disclaimer, the term of this patent is extended or adjusted under 35 U.S.C. 154(b) by 198 days.

(21) Appl. No.: 10/788,353

(22) Filed: Mar. 1, 2004

(65) Prior Publication Data

US 2004/0257829 A1    Dec. 23, 2004

(30) Foreign Application Priority Data

Jun. 20, 2003   (JP) .............................. 2003-176280

(51) Int. Cl.
*F21V 8/00* (2006.01)
(52) U.S. Cl. ...................... 362/555; 362/558; 362/612; 362/85; 362/27; 362/602
(58) Field of Classification Search ................ 362/555, 362/558, 559, 560, 85, 29, 612, 613, 27, 362/602
See application file for complete search history.

(56) References Cited

U.S. PATENT DOCUMENTS

| 6,179,432 B1 * | 1/2001 | Zhang et al. .................. 362/84 |
| 6,284,988 B1 * | 9/2001 | Watanabe et al. ........... 200/5 A |
| 6,575,586 B1 * | 6/2003 | Tsau ............................ 362/85 |
| 6,860,612 B1 * | 3/2005 | Chiang et al. ................ 362/29 |
| 6,918,677 B1 * | 7/2005 | Shipman ...................... 362/26 |

FOREIGN PATENT DOCUMENTS

| JP | 7-73777 | 3/1995 |
| JP | 9-319481 | 12/1997 |
| JP | 2002-251937 | 9/2002 |

* cited by examiner

*Primary Examiner*—Stephen Husar
*Assistant Examiner*—Peggy A. Neils
(74) *Attorney, Agent, or Firm*—Wenderoth, Lind & Ponack, L.L.P.

(57) ABSTRACT

An illumination device LK comprises a planar light guiding element 3 having a first face 3c and a second face 3d, which are substantially parallel to each other, and a predetermined number (equal to or greater than one) of light sources 2-1, 2-2 for emitting light from a light emitting side along a main light emission axis A. The planar light guiding element 3 has inserting means 3h for allowing insertion of at least one of the light sources 2-1, 2-2 separately so that the main light emission axis A is substantially parallel to the first face 3c and the second face 3d.

13 Claims, 2 Drawing Sheets

ILLUMINATION DEVICE AND ILLUMINATED INPUT DEVICE

BACKGROUND OF THE INVENTION

1. Field of the Invention

The present invention relates to an illumination device used in a keyboard, etc., which is an input section of a computer, and an illuminated input device such as a keyboard in which the illumination device is installed.

2. Description of the Background Art

There exist various types of illuminated input devices (e.g., a keyboard in which an illumination device is installed) for allowing a user to use a computer, or the like, in poorly lit places or at night. For example, in an illuminated input device disclosed in U.S. Pat. No. 6,284,988 and Japanese Patent Laid-Open Publication No. 2002-251937, an electroluminescence (EL) sheet is used in the keyboard; light emitted therefrom passes through translucent key tops and illuminates all input keys.

Also, in an illuminated input device disclosed in Japanese Patent Laid-Open Publication No. H7-73777, each input key of the keyboard is provided with a light emitting member. Specifically, light from the light emitting member such as a light emitting diode (LED), which is placed just under each translucent key top, passes through the key top, and emphasizes characters and numbers on the key tops, thereby increasing visibility in low light conditions.

Also, Japanese Patent Laid-Open Publication No. H9-319481 discloses an illuminated input device provided with a light source, which is placed in a position away from the input keys, and a light guiding path to each input key. In this illuminated input device, a light source such as a light emitting diode is placed in a space between the key tops, and a light guiding path is formed therefrom to four surrounding key tops. Light is guided to each key top from the four light guiding paths surrounding the key top. A translucent resin capable of diffusing light is used as a material for the key top. Thus, the key tops are illuminated evenly. In this case, the number of necessary light sources is nearly equal to the number of key tops.

Furthermore, Japanese Patent Laid-Open Publication No. 2002-251937 discloses an illuminated input device illuminating the entire keyboard. This illuminated input device uses an EL sheet as a light emitter, thereby illuminating the entire keyboard with a single light source.

The EL sheet adopted in the illuminated input device disclosed in U.S. Pat. No. 6,284,988 and Japanese Patent Laid-Open Publication No. 2002-251937 has the following disadvantages as compared to other light sources: the EL sheet is expensive and requires increased production cost due to the need of an inverter circuit as a driving unit, requires a measurable amount of power, and high running costs due to its short life span, produces an uncomfortable vibration noise while the light is on, and poorly illuminates the keyboard due to its low illuminance, which is about one tenth of the illuminance of the LED.

On the other hand, the illuminated input device disclosed in Japanese Patent Laid-Open Publication No. H7-73777 and Japanese Patent Laid-Open Publication No. H9-319481 requires an amount of light sources equal to almost as many as the number of key tops of the input keys. Specifically, even if the LED adopted in the above illuminated input device is an inexpensive light source compared to the EL sheet, there is the need to use as many LEDs as key tops (whose number is about 80 to 90). Thus, the production cost of the keyboard is increased due to an increased cost of the light source and an increased number of stages in the assembly process of the keyboard.

SUMMARY OF THE INVENTION

Therefore, an object of the present invention is to provide an inexpensive illumination device requiring a small number of component parts and stages in the assembly process, which is capable of evenly illuminating the entire input portion of the input device with a small number of light sources, and an illuminated input device such as a keyboard in which the illumination device is installed.

The present invention has the following features to attain the object mentioned above.

An illumination device according to the present invention comprises a planar light guiding element having a first face and a second face, which are substantially parallel to each other, and a predetermined number of light sources for emitting light from a light emitting side along a main light emission axis. The planar light guiding element has inserting means (apertures) for allowing separate insertion of the light sources so that the main light emission axis is substantially parallel between the first face and the second face.

Based on the present invention, it is possible to realize an inexpensive illumination device composed of a small number of part components, which is capable of evenly illuminating the entire input device with a small number of light sources, and an illuminated input device such as a keyboard, etc., in which the illumination device is installed.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, with reference to FIGS. 1, 2, and 3, an illuminated input device according to an embodiment of the present invention will be described.

Figure 1:
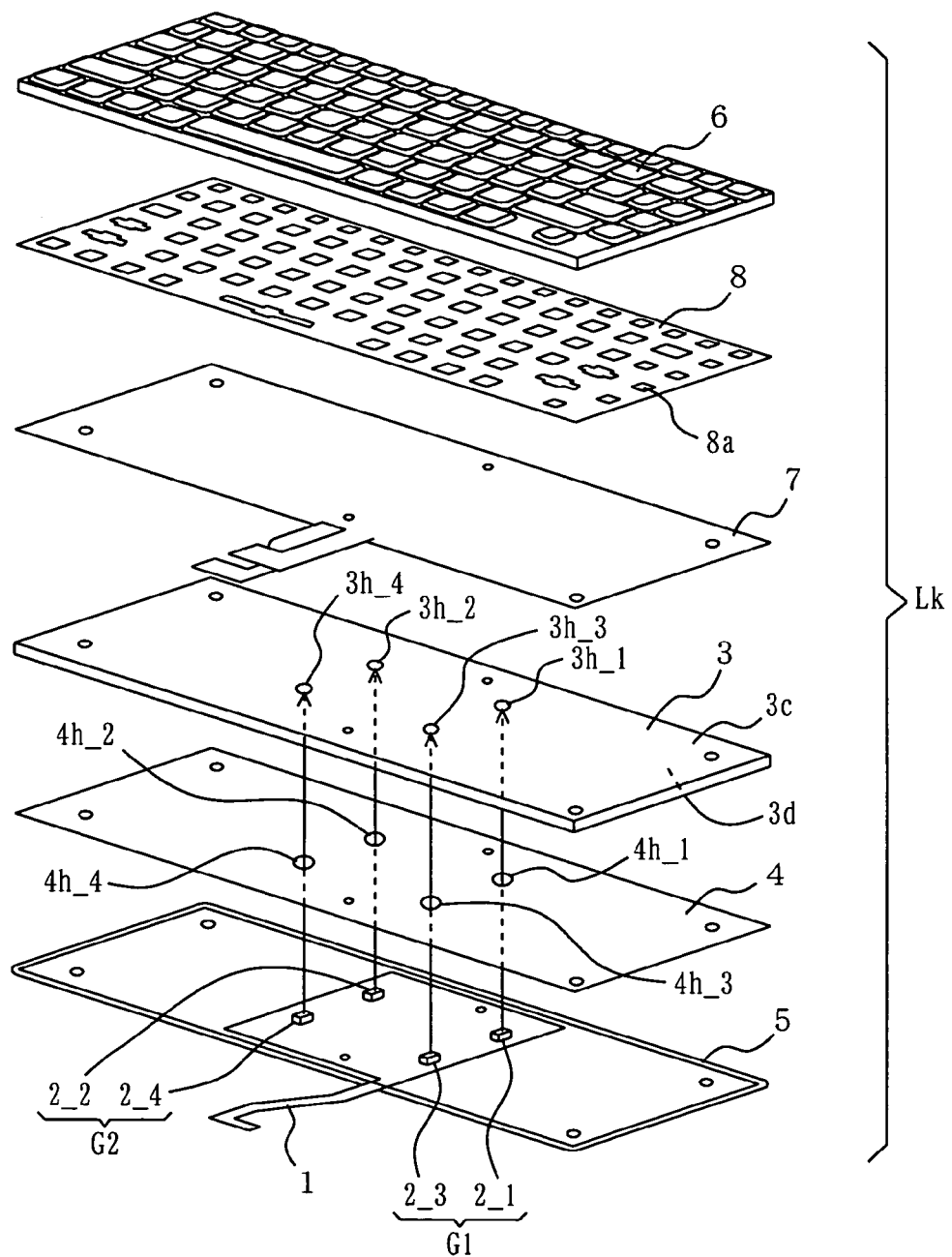
FIG. 1 is an exploded perspective view for illustrating the structure of an illuminated input device according to the present invention.

As shown in the exploded perspective view of FIG. 1, an illuminated input device LK includes a print board 1, a light source 2 (2-1, 2-2, 2-3, 2-4), a light guiding element 3, a reflecting member 4, a base member 5, an input member 6, a pressure-sensitive member 7, and an attenuation member 8. The print board 1 is placed on the base number 5. Four light sources (2-1, 2-2, 2-3, 2-4) are mounted on the print board 1. Each light source 2 emits light from its end face along a main light emission axis A, which extends in one direction and is substantially perpendicular to the end face. For convenience of description, the four light sources 2 are referred to, if necessary, as light source 2-1, light source 2-2, light source 2-3, and light source 2-4, respectively.

The reflecting member 4, whose planar configuration is substantially the same as the light guiding element 3, is placed on the print board 1. The reflecting member 4 has four apertures, whereby the four light sources 2-1, 2-2, 2-3, and 2-4, which are mounted on the print board 1, pass through an aperture 4h-1, an aperture 4h-2, an aperture 4h-3, and an aperture 4h-4, respectively. Over the reflecting member 4, four apertures are provided in the light guiding element 3 for allowing insertion of the four light sources 2-1, 2-2, 2-3, and 2-4 into an aperture 3h-1, an aperture 3h-2, an aperture 3h-3, and an aperture 3h-4, respectively. That is, the four light sources 2-1, 2-2, 2-3, and 2-4 are inserted into the respective apertures 3h-1, 3h-2, 3h-3, and 3h-4 of the light guiding element 3. Note that each aperture 3h has an arc-shaped side, which lies close to a light emitting side of the respective light source 2.

Figure 2:
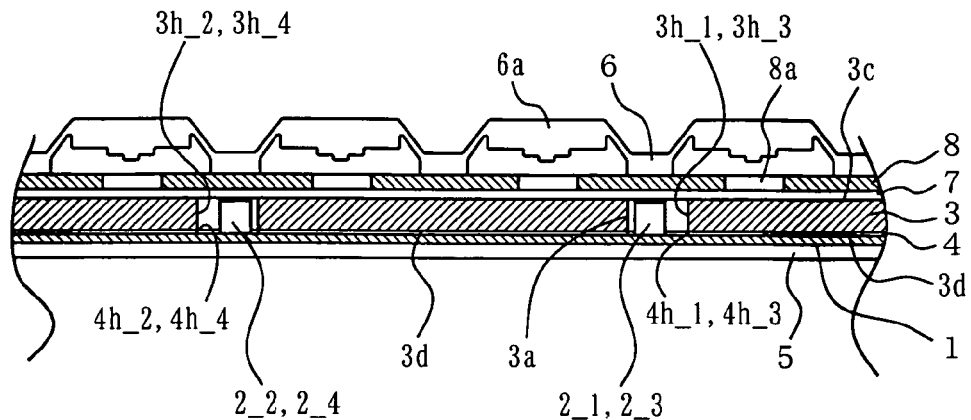
FIG. 2 is a fragmentary sectional view of the illuminated input device shown in FIG. 1.
Figure 3:
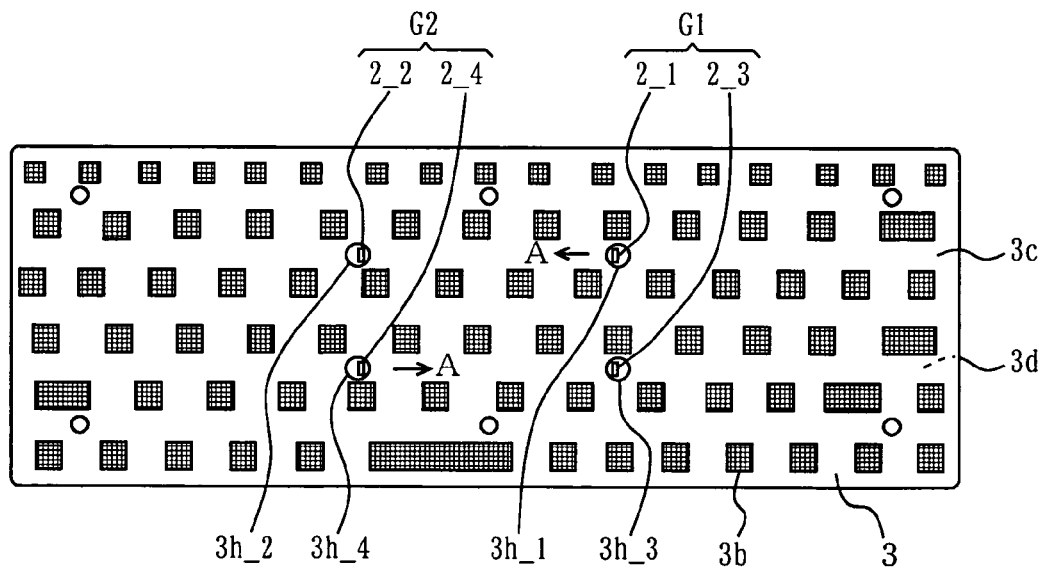
FIG. 3 is an illustration showing a relationship between a light source and a light guiding element shown in FIG. 1.

As shown in FIGS. 2 and 3, the light guiding element 3 has dot pattern sections 3b on its lower face 3d for vertically reflecting and/or refracting the light traveling in a horizontal direction in the light guiding element 3. That is, the light traveling in the horizontal direction in the light guiding element 3 is reflected by each of the dot pattern sections 3b, and diverts its path toward an upper face 3c. This reflected light exits from the upper face 3c of the light guiding element 3. With this arrangement, as clearly illustrated in FIG. 1 and FIG. 3, the light sources 2-1, 2-2, 2-3 and 2-4 are each located inside the outer contour of the planar light guiding element 3, and form a rectangular shape. Note that, in FIG. 3, the dot pattern sections 3b are shown as shaded portions.

Here, FIG. 1 will be described in detail again. The pressure-sensitive member 7 is placed on the light guiding element 3 for detecting a depressed portion. The attenuation member 8 is placed on the pressure-sensitive member 7. The input member 6 having a plurality of translucent input keys 6a is placed on the attenuation member 8. Note that the attenuation member 8 has a plurality of through windows 8a for the respective input keys 6a, each of which is placed immediately above the corresponding through window 8a, so that the light passes through each input key 6a individually. When the input key 6a somewhere on the input member 6 is depressed, the pressure-sensitive member 7 detects which input key 6a is depressed.

As shown in FIG. 3, the light source 2 (collectively preferring to light sources (2-1, 2-2, 2-3, 2-4), which is inserted into the aperture 3h (collectively referring to apertures 3h-1, 3h-2, 3h-3, 3h-4) of the light guiding element 3, is mounted on the print board 1 so that the main light emission axis A extends in the substantially horizontal direction with respect to the upper face 3c and the lower face 3d of the light guiding element 3. Note that the light emitted from the light source 2 travels in the light guiding element 3 while diffusing around the main light emission axis A at a predetermined angle. Furthermore, as shown in FIG. 3, the main light emission axis A is substantially parallel to the longitudinal axis of the light guiding element 3.

The four light sources 2-1 to 2-4 are placed so that two pairs of light sources are arranged in horizontal rows (arranged in a direction) parallel to a long side of the light guiding element 3, and each pair is placed so that their respective main light emission axes A face each other. In the present embodiment, the light sources 2-1 and 2-3 comprise a first light source group G1, and the light sources 2-2 and 2-4 comprise a second light source group G2. The light sources of the first group and the second group are each located so as to be a predetermined distance from a center of the light guiding element 3.

Also, the dot pattern sections 3b of the light guiding element 3 are placed just under the corresponding input keys 6a, which are to be illuminated. Note that FIG. 3 is an overhead view of the light guiding element 3, but the dot pattern sections 3b on the lower face 3d of the light guiding element 3 are visible from the upper face because the light guiding element 3 is composed of a translucent material.

In the illuminated input device structured as described above, the light emitted from the four light source 2-1, 2-2, 2-3, 2-4 mounted on the print board 1 enters from the arc-shaped side of the aperture 3h of the light guiding element 3, and is reflected by the dot pattern sections 3b on the lower face 3d of the light guiding element 3. Then, the horizontal light rises in a perpendicular direction, and exits from the upper face 3c of the light guiding element 3. As a result, the light emitted from the upper face 3c of the light guiding element 3 illuminates the input member 6 after passing through the pressure-sensitive member 7 and the attenuation member 8. In this case, the input keys 6a are particularly brightly illuminated by means of the dot pattern sections 3b.

Also, the four light sources 2-1, 2-2, 2-3, and 2-4, are arranged in horizontal rows arranged along a direction parallel to a longitudinal direction of the illuminated input device LK as the first light source group G1 (the light sources 2-1 and 2-3) and the second light source group G2 (the light sources 2-2 and 2-4), and the two light sources included in each group are placed so as to face each other (i.e., to emit light only towards each other). As a result, the light emitted from the light source 2 is efficiently supplied to the entire portion of the light guiding element 3. Furthermore, the aperture 3h of the light guiding element 3 has an arc-shaped side, which lies close to a light emitting side of the light source 2, whereby it is possible to efficiently diffuse the amount of light entering the light guiding element 3 for light guiding.

Also, the attenuation member 8 attenuates the brightness of light near the light source 2, whereby it is possible to effectively reduce unevenness in brightness between an area near the light source 2 and an area distant therefrom.

In the present embodiment, the print board 1 is a flexible printed circuit (FPC), and the four light sources 2-1, 2-2, 2-3, 2-4 are mounted thereon. As the print board 1, an epoxy board, for example, may be used in place of the FPC. Each light source 2 is a white LED, and its height is less than or equal to 0.6 mm. The light guiding element 3 is a transparent acrylic resin board, and its thickness is less than or equal to 0.8 mm. The reflecting member 4 is a white sheet, and its thickness is less than or equal to 188 μm. The input member 6 is a keyboard, etc., used for a personal computer, and rubber or resin is used to form the input member 6. In the present embodiment, a rubber input member 6 is shown as an example. In this case, rubber is used as a translucent material for allowing the light to pass through a character portion of the input key. The resin input member 6 (not shown) can be used so that the light passes through the entire portion of the keyboard, or the light passes through only a character portion of the input key. The pressure-sensitive member 7 is a membrane switch, which is typically used in the keyboard. When the pressure-sensitive member 7 is depressed, contacts embedded therein come in touch with each other, whereby an electrical signal flows.

As such, according to the present embodiment, it is possible to illuminate all input keys of the input member 6 only by the four light sources.

Note that, in the present embodiment, only the input keys are illuminated by means of the dot pattern sections 3b. However, it is also possible to illuminate the entire portion of the input device by forming the dot pattern sections to cover almost all the area of the lower face of the light guiding element 3.

Also, in the present embodiment, four light sources are used for illuminating the entire portion of the input member. If a size of the input member is increased, the number of light sources may be increased so as to become an even number (e.g., six or eight) for enhancing the brightness. On the other hand, if the size of the input member is reduced, two light sources may be used for reducing the brightness. That is, the number of light sources can be adjusted appropriately in accordance with the size of the input member, which is to be illuminated, and the brightness of the light source. Also, the placement of the light sources can be adjusted appropriately in accordance with the number of light sources. Thus, if one light source has enough brightness, it is possible to illuminate the entire portion of the input member by one light source. In this case, it is also possible to place the light source in any desired position.

Also, if a light shielding member is used as the attenuation member 8, the light emitted from the upper face 3c of the light guiding element 3 is shut out, and passes through only the aperture 8a. Thus, it is possible to illuminate a necessary portion of the input member.

As such, in the illuminated input device of the present embodiment, it is possible to illuminate approximately 80 to 90 input keys of the keyboard of the personal computer, etc., by only four light sources, whereby reduction of part cost and number of stages in the assembly process of the keyboard, for example, is realized.

As such, according to the present invention, a plurality of light sources are inserted into corresponding apertures placed inside of a planar light guiding element, and a main light emitting direction is substantially parallel to a plane of the planar light guiding element. Also, a predetermined number of the plurality of light sources are divided into groups, the light sources are arranged in horizontal rows parallel to a long side of the planar light guiding element, and the light sources belonging to the same group are placed so as to face each other (i.e., the light sources of the first group face the light sources of the second group). As a result, it is possible to realize an inexpensive illumination device composed of a small number of part components, which is capable of evenly illuminating the entire portion of the input device with a small number of light sources, and an illuminated input device such as the keyboard, etc., in which the illumination device is installed.

Furthermore, the plurality of light sources are inserted into the corresponding apertures placed inside of the planar light guiding element, and the main light emission axis of the light source is substantially parallel to the plane of the planar light guiding element, whereby it is possible to efficiently perform light guidance for the light emitted from the light sources into the planar light guiding element.

Also, the plurality of light sources is divided into two groups, which are placed so that the light sources included in each group are arranged in horizontal rows arranged in a direction parallel to a long side of the planar light guiding element, and the light sources belonging to the same group are placed so as to face each other (i.e., the light sources of group 1 face the light sources of group 2), whereby it is possible to illuminate the entire portion of the input device with a small number of light sources. As a result, it is possible to reduce the number of part components.

Each of the apertures of the planar light guiding element, into which the light source is inserted, has an arc-shaped side lying close to the light emitting side of the light source, whereby it is possible to efficiently diffuse the light which enters the planar light guiding element from the light source, for light guiding.

A plurality of dot pattern sections are provided for refracting the light in a direction at right angles to the plane of the planar light guiding element, thereby reflecting the light entering the planar light guiding element from the light source. As a result, it is possible to efficiently emit light from the plane of the planar light guiding element.

Furthermore, the dot pattern sections correspond to the respective input keys of the input device to be illuminated, whereby it is possible to efficiently illuminate the character portion of the input key. Also, the dot pattern sections may be formed to cover almost all the area of the planar light guiding element, whereby it is possible to illuminate the entire portion of the illuminated input device.

The attenuation member is placed between the pressure-sensitive member and the input member, whereby it is possible to efficiently reduce unevenness in brightness between an area near the light source and an area distant therefrom. Also, the shielding member having the apertures may be placed between the pressure-sensitive member and the input member, whereby it is possible to illuminate only a necessary portion of the input member.

The present invention can be widely applied to an illumination device installed in an input device having a plurality of keys, such as a personal computer and a PDA, for example.

While the invention has been described in detail, the foregoing description is in all aspects illustrative and not restrictive. It is understood that numerous other modifications and variations can be devised without departing from the scope of the invention.

What is claimed is:

1. An illumination device comprising:
   a planar light guiding element having a first face and a second face, which are substantially parallel to each other; and
   an even number of light sources for emitting light from a light emitting side along a main light emission axis, wherein:
   the planar light guiding element has apertures into which each of the light sources is inserted separately so that the main light emission axis is substantially parallel to and between the first face and the second face, substantially parallel to a first direction, and substantially parallel to a longitudinal axis of the planar light guiding element,
   the even number of light sources being divided into:
      a first group of the light sources including light sources arranged so that a light emitting side of each of the light sources of the first group is oriented in the first direction; and
      a second group of the light sources including light sources arranged so that a light emitting side of each of the light sources of the second group is oriented in a second direction opposite the first direction, the number of light sources of the first group being equal to the number of light sources of the second group, and
   the light sources of the first group and the light sources of the second group are each located inside an outer contour of the planar light guiding element at a position located a predetermined distance from a center of the planar light guiding element in a longitudinal direction of the planar light guiding element.

2. The illumination device according to claim 1, wherein each of the first group of light sources and the second group of light sources includes at least two light sources, the light sources of each of the first group and the second group being arranged along a latitudinal direction of the planar light guiding element.

3. The illumination device according to claim 2, wherein the first light source group and the second light source group are arranged so as to be symmetrical with respect to the latitudinal direction of the planar light guiding element.

4. The illumination device according to claim 1, wherein each of the apertures has an arc-shaped side adjacent to the light emitting side of the respective light source.

5. The illumination device according to claim 1, wherein the second face has a plurality of dot patterns for refracting light emitted from each light source toward the first face.

6. The illumination device according to claim 5, wherein a number of dot patterns is nearly equal to a number of input keys of an input device to be illuminated.

7. The illumination device according to claim 5, wherein the dot patterns are formed all over the second face.

8. An illuminated input device comprising:
the illumination device according to claim 7;
a base member which is placed on the second face of the planar light guiding element;
a reflecting member, which is nearly identical in shape with the planar light guiding element, placed between the planar light guiding element and the base member;
a print board, on which the light source is mounted, placed between the reflecting member and the base member;
an input member, which is placed on the first face of the planar light guiding element and is composed of a translucent material; and
a pressure-sensitive member, which is placed between the planar light guiding element and the input member, for detecting depression when any portion of the input member is depressed.

9. The illuminated input device according to claim 8, further comprising an attenuation member between the pressure-sensitive member and the input member.

10. The illuminated input device according to claim 9, wherein the attenuation member has apertures in positions corresponding to the input keys of the input member.

11. The illumination device of claim 1, wherein each of the light sources of the first group is shaped and oriented to emit light only in the first direction, and each of the light sources of the second group is shaped and oriented to emit light only in the second direction opposite the first direction.

12. The illumination device of claim 1, wherein the even number of light sources are arranged in a rectangular shape.

13. An illuminated input apparatus comprising:
an illumination device including:
a planar light guiding element having a first face and a second face, which are substantially parallel to each other; and
an even number of light sources for emitting light from a light emitting side along a main light emission axis, wherein:
the planar light guiding element has apertures into which each of the light sources is inserted separately so that the main light emission axis is substantially parallel to and between the first face and the second face;
an input member on the first face of the planar light guiding element and composed of a translucent material;
a pressure-sensitive member between the planar light guiding element and the input member, for detecting depression when any portion of the input member is depressed; and
an attenuation member between the pressure-sensitive member and the input member.

* * * * *